Feb. 19, 1929.

G. SMITH 1,702,367

COIN FREED APPARATUS FOR PLAYING FOOTBALL AND OTHER LIKE GAMES

Original Filed Aug. 13, 1923   6 Sheets-Sheet 1

Feb. 19, 1929.　　　　　　　　　　　　　　　　　　　　1,702,367
G. SMITH
COIN FREED APPARATUS FOR PLAYING FOOTBALL AND OTHER LIKE GAMES
Original Filed Aug. 13, 1923　　　6 Sheets-Sheet 2

INVENTOR
Gordon Smith
BY
Richard S. Babcock
ATTORNEY

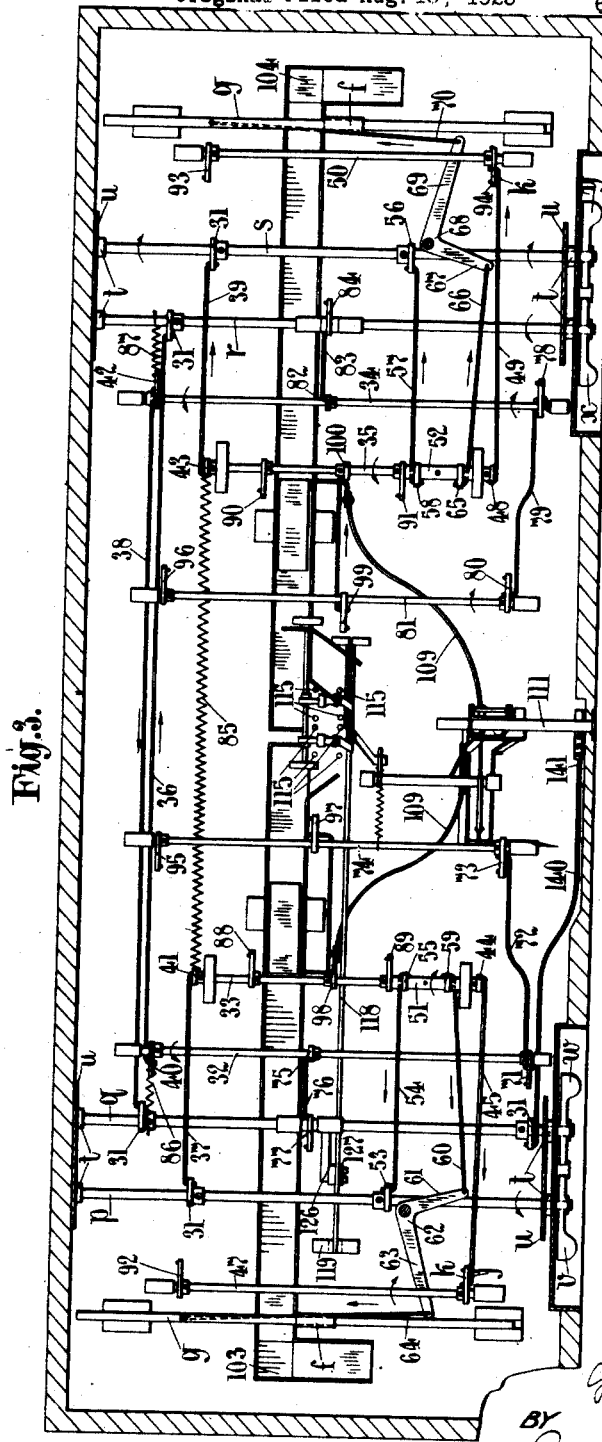

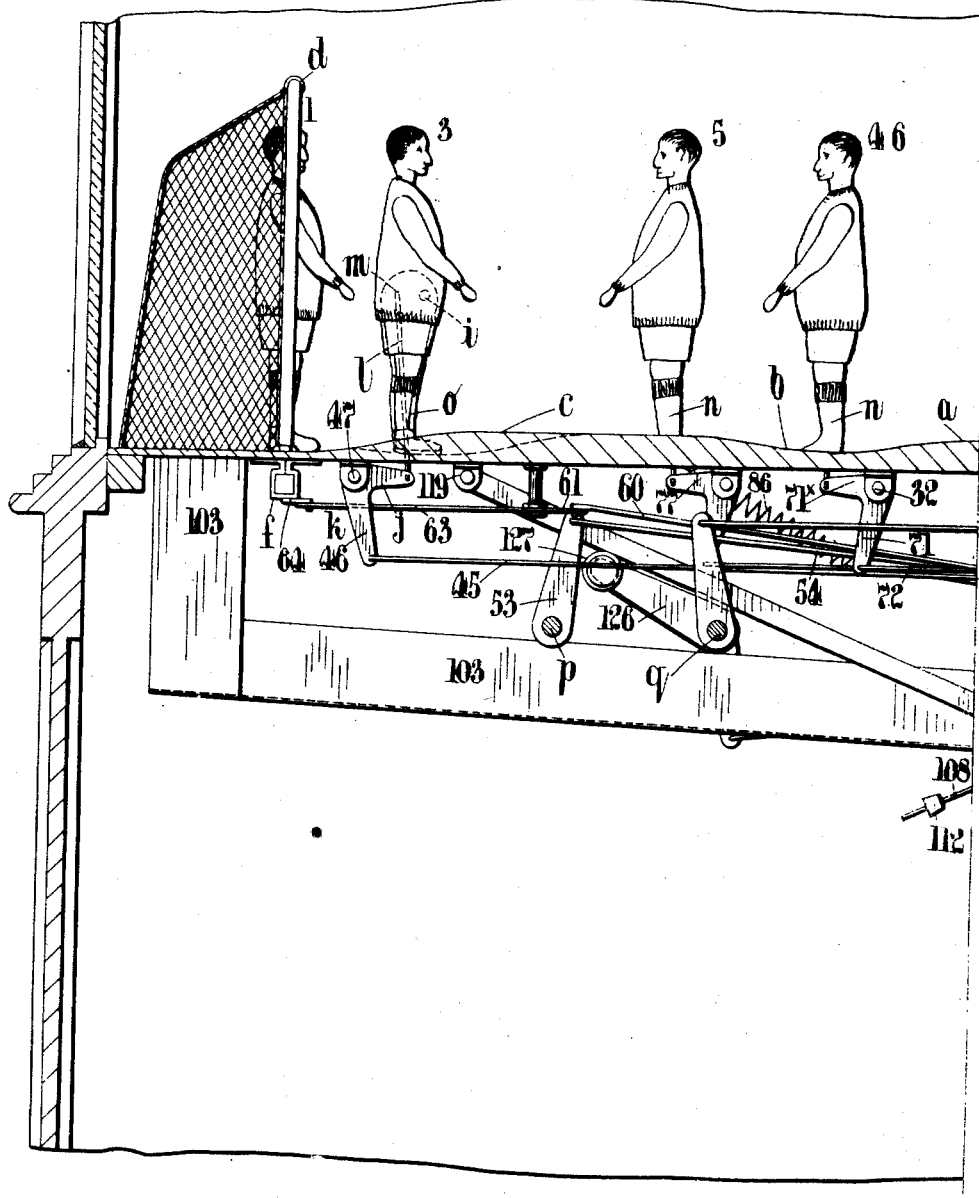

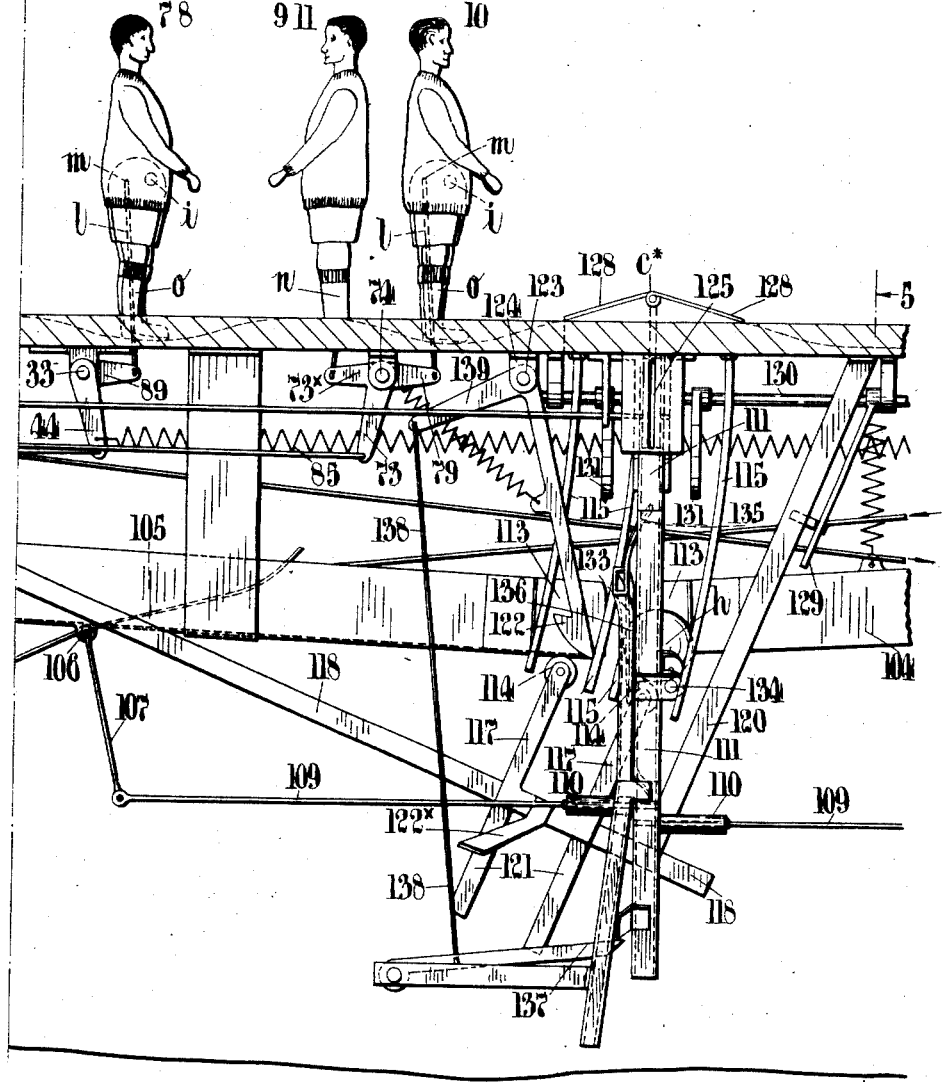

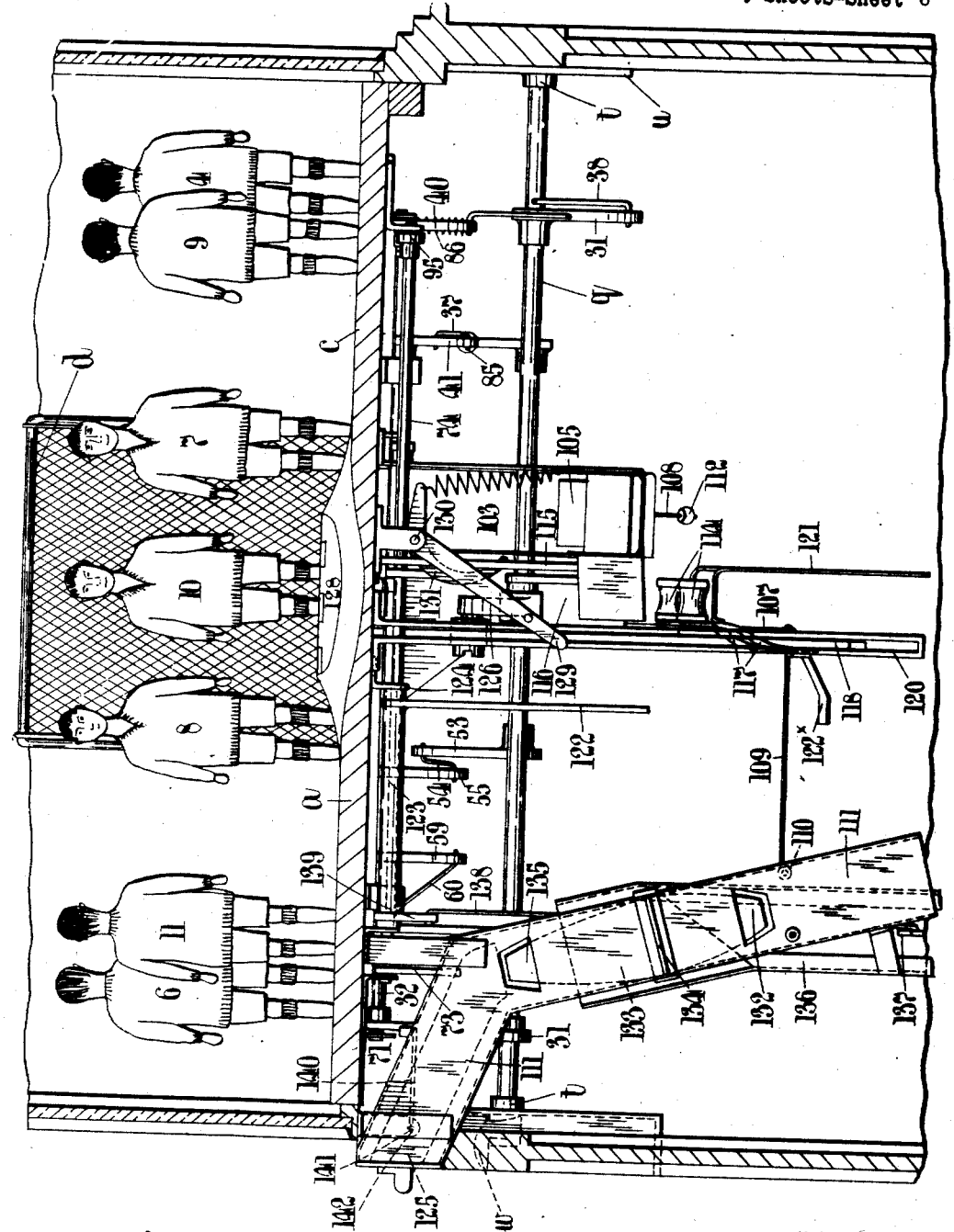

Patented Feb. 19, 1929.

1,702,367

UNITED STATES PATENT OFFICE.

GORDON SMITH, OF SOUTHEND-ON-SEA, ENGLAND, ASSIGNOR TO CHESTER-POLLARD AMUSEMENT COMPANY, INC., OF NEW YORK, N. Y., A CORPORATION OF NEW YORK.

COIN-FREED APPARATUS FOR PLAYING FOOTBALL AND OTHER LIKE GAMES.

Original application filed August 13, 1923, Serial No. 657,230, and in Great Britain August 26, 1922. Divided and this application filed August 13, 1926. Serial No. 128,999.

This invention relates to a coin or token mechanism and, additionally, embraces, in certain aspects, a control mechanism; the invention being capable of use in numerous different associations but being of particular value when employed in connection with games.

This case in a division of United States application for patent on a game, Serial No. 657,230, filed in the United States Patent Office August 13, 1923.

It is an object of the invention to provide a device of this character which will efficiently operate to permit or prevent the actuation of a device with which it is associated as, for example, a game mechanism.

It is a further object of the invention to construct a device of this nature which will operate—when used in conjunction with a game mechanism—to deliver a missile impelled in the game and by the mechanism thereof, to an operative position.

A still further object is that of constructing such a mechanism which may embody an improved coin or token return, the present invention contemplating, as one of its features, a mechanism whereby, for example, such return will be effected dependent upon the skill of operation of the game mechanism.

Another object is that of furnishing such a device in which relatively few and individually rugged and simple parts will be employed, which may be assembled with facility to provide a mechanism operating over long periods of time with freedom from difficulty, and which mechanism will be relatively inexpensive With these and further objects in mind, reference is had to the attached sheets of drawings, illustrating a practical embodiment of the invention and showing the same in association with a game of the football type. In these drawings:

Fig. 3 is a sectional plan view taken along the lines 3—3 and in the direction of the arrows of Fig. 1;

Fig. 4 is an enlarged sectional side view taken along the lines 4—4 and in the direction of the arrows of Fig. 2, and Fig. 5 is a transverse sectional view taken along the lines 5—5 and in the direction of the arrows of Fig. 4.

Figure 1:
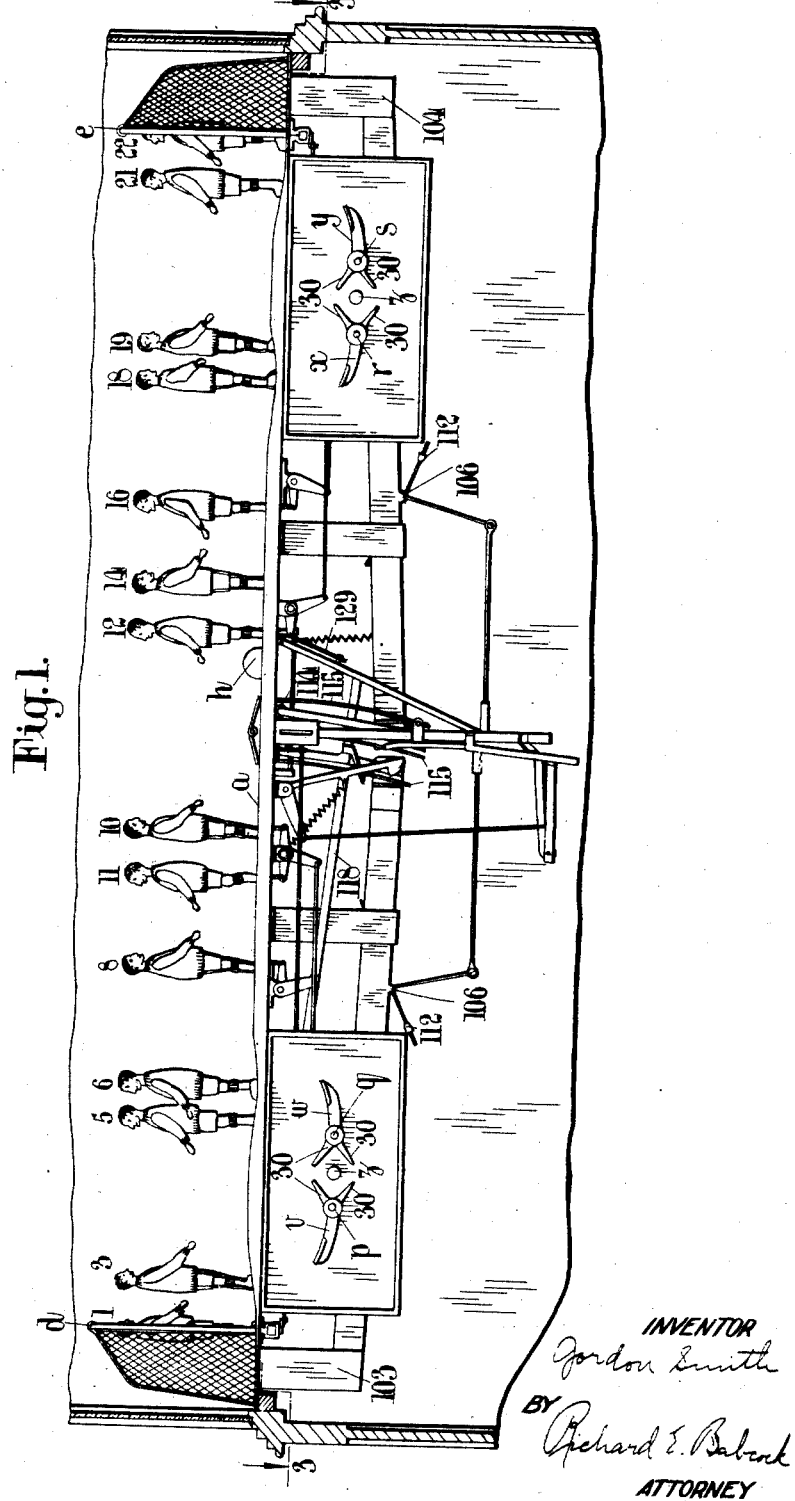
Figure 1 is a side elevation of such a game and showing one arrangement of parts providing a mechanism within the province of this invention.

As afore brought out, while the invention is capable of use in various different associations, it is primarily adapted to be operatively employed in conjuction with a game mechanism. As such, the structure utilized may take various forms, according to the type of device of which it forms a part. In the present instance, in view of the fact that the embodiment illustrated is designed for use with a football game, it has been shown accordingly. At this time it is to be distinctly understood, however that, except where otherwise definitely limited, the structure may be changed in numerous respects and the component elements of the mechanism employed may be rearranged and redesigned, as desired, without departing from the teachings of this invention.

Thus, with primary consideration of the game mechanism in connection with which this invention has been shown, it will be seen that the reference character $a$ indicates the deck of the game which, in the present exemplification, simulates in appearance a football field and is provided with a number of depressions $b$ formed by a series of ridges or mounds $c$. At opposite ends of the field provided by the deck goals $d$ and $e$ are situated, and may include in miniature, duplicates of conventionally-constructed goals. The deck, in advance of each of the goals, is provided with a slot extending transversely thereof and, in the present instance, below this slot there is mounted a rod $g$ upon which a carriage $f$ is freely slidable for a purpose hereinafter brought out. A missile or projectile $h$, which may be a miniature football, is freely movable over the field.

Positioned upon the field are two opposed groups of projectile-impelling members, in the present instance simulating the appearance of football players: these figures being identified by the numerals 1 to 22 inclusive; it being observed that the numerals 1 and 22 indicate goal-keeper figures and that the intervening numerals indicate the player figures, these figures being disposed in one of two groups, each constituting a team, and the two teams facing in opposite directions.

Figure 2:
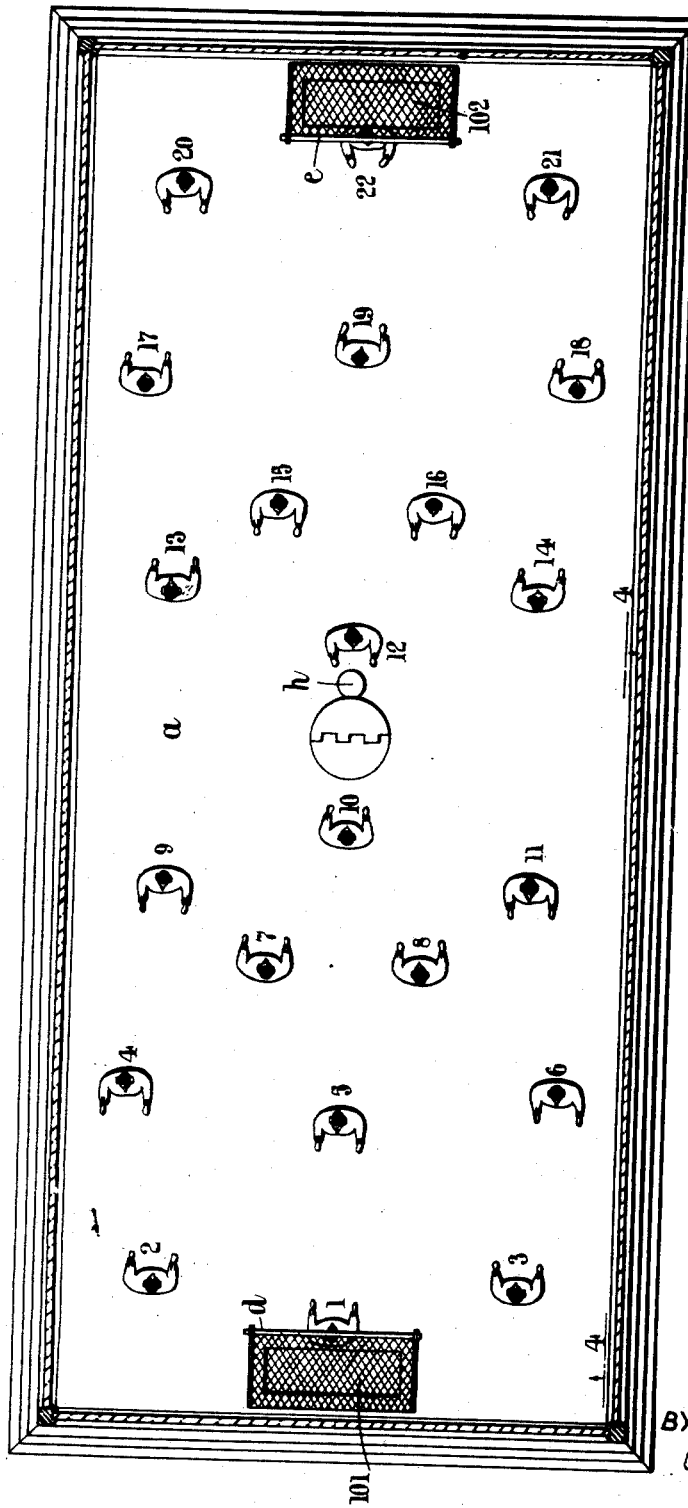
Fig. 2 is a plan view of the device as shown in Figure 1.

Each of the figures 2 to 21 inclusive may include a body from which a rigid leg $n$ extends downwardly and is firmly attached to the deck of the game. The second leg $o$ is pivoted to the body as at $i$, and provides a missile-projecting member in that a link $l$ has its upper end attached to this leg to the rear of the pivot as at $m$, its lower end being secured to the arm $j$ of a bell-crank lever $k$, hereinafter more particularly described. As a consequence, when the lever is rocked the link will be moved downwardly to swing the leg $o$, and if a projectile or missile is resting in advance thereof it will be obvious that it will be impelled across the deck at a speed corresponding to that with which the animated portion of the figure is moved.

With a view to actuating the animated portions of the figures or other impelling members, shafts $p$, $q$, $r$ and $s$ extend transversely of the deck and below the same, these shafts being mounted in bearings $t$ carried by brackets $u$ which are suitably attached to the machine frame. The shafts are oscillated by means of exterior handles $v$, $w$, $x$ and $y$, the movement of which is limited by pins $z$ cooperating with projections 30 extending from said handles. Below the deck shafts 32, 33, 34 and 35 are mounted, and these shafts carry arms 40, 41, 42 and 43, which have one end of links 36, 37, 38 and 39 secured to them, the opposite ends of these links being secured to arms 31 attached to shafts $p$, $q$, $r$ and $s$.

The bell-crank levers $k$ are mounted one upon each of shafts 47 and 50, and the arms 46 of these levers are attached to the outer ends of links 45 and 49 respectively, the inner ends of these links being secured to arms 44 and 48 attached to the shafts 33 and 35 respectively. These latter shafts loosely mount sleeves 51 and 52, the first of which carries an arm 55 connected to one end of a link 54, the opposite end of which is connected to an arm 53 carried by the shaft $p$. The sleeve 52 has an arm 58 attached thereto, which mounts one end of a link 57, the opposite end of which is secured to an arm 56 carried by the shaft $s$. These sleeves also carry arms 59 and 65, the first being connected by a link 60 to the arm 61 of a bell-crank lever 62 mounted, in the present instance, to move in a horizontal plane; the second arm 63 of this lever being link-connected as at 64 to the carriage $f$ adjacent which it lies. Similarly, the arm 65 is link-connected as at 66 to an arm 67 of a bell-crank lever 68 corresponding to the bell-crank lever 62 and likewise having an arm 69 which is link-connected as at 70 to the carriage $f$ adjacent which it is positioned.

Mounted below the deck of the game are shafts 74 and 81, the former being actuated in that it has attached to it an arm 73 connected by a link 72 to an arm 71 secured to the shaft 32, and the latter being actuated in that, similarly, it has an arm 80 connected to one end of a link 79, the opposite end of which is attached to an arm 78 mounted upon the shaft 34. Bell-crank levers 77 and 84 are rockingly mounted below the deck, and the first is connected by means of a link 76 to an arm 75 secured to the shaft 32, while the latter is connected by a link 83 to an arm 82 attached to shaft 34. In order that the parts normally may assume a position at which the impelling members or, specifically, the animated portions of the figures, are in a position which, upon their being actuated, will result in movement being imparted to any projectile or missile resting in front of the same, a spring 85 is secured to arms attached to the shafts $p$ and $s$, for example, the arms 41—43. Springs 86 and 87 are likewise connected to arms attached to the shafts $p$ and $s$, for example, arms 40—42.

The shafts 32, 33, 34, 35, 47, 50, 74 and 81 actuate, respectively, the animated portions (specifically, the kicking legs) of the players 4—6, 7—8, 17—18, 15—16, 2—3, 20—21, 9—11, 13—14, by means of arms $40^x$—$71^x$, 88—89, $42^x$—$78^x$, 90—91, 92—$j$, 93—94, 95—73, 96—80, secured to these shafts. The horizontal arms of the bell-crank levers 77—84 are connected by links, as aforedescribed, to the animated portions of the player figures 5 and 19. In order to actuate the animated portions of players 10 and 12, the shaft 74 loosely mounts a bell-crank lever 97 having one of its ends connected to the animated portion of the first-named player; its second arm being link-connected to an arm 98 secured to the shaft 33. Likewise, a bell-crank lever 99 is loosely mounted upon shaft 81 and has one of its arms connected to the animated portion of player figure 12, its second arm being link-connected to an arm 100 secured to the shaft 35.

To the rear of the goals $d$ and $e$ the deck is formed with openings 101—102 of a size adequate to allow for the passage of the missile $h$, and it is obvious that the operator having control of the handles or levers $v$—$w$ may, by shifting the first-named handle, operate the goal-blocking mechanism. This will result, in the present instance, in a shifting of the goal-keeper figure laterally to intercept the ball, thus blocking the goal and preventing the missile from dropping through the opening 101 to the rear of such goal and causing the missile to rebound onto the field. Also, the operator, by manipulating the handle $w$ may assume the aggressive by causing the movable portions of the figures to be animated and project the missile toward his opponent's goal; it being appreciated that such opponent, by means of the handles $x$—$y$, likewise may assume the defensive or offensive, blocking the path of travel of the missile and propelling it in an opposite direction and guarding against such missile passing between the goal posts and into the opening 102.

Extending from the openings to the rear of the goal posts are inclined chutes. The base of each chute is interrupted adjacent its lower end, and at these points plates 105 are swingingly mounted by means of a shaft 106. Normally, as has been shown in the second section of Fig. 4, the plate extends upwardly within the chute, incident to an extension 108 attached to the shaft and mounting at its outer end a counter-weight 112; a link 109 in each instance being attached to the lower end of the arm 107, the inner ends of the links being guided by members 110 and extending, as hereinafter described, to control the operation of the game by the delivery of the missile to the deck.

While the operation of the game may be controlled in a number of different ways, it is preferred that such control be exercised by the presence or absence of the missile, in the present instance, the ball $h$, from the upper surface of the field. Obviously, after a goal has been scored, and the ball passed through one of the openings 101—102, the game may not be played further until the ball is returned to the field, which, in the present instance, is accomplished preferably by having a delivery mechanism which effects such return at a point to one side of the center of the field and in proper position with respect to the goal last scored. Such a mechanism may include two guides 115 extending adjacent openings 113 formed in the chutes 104—105, these guides defining passageways 116 through which an object may be moved by means of projecting members, each including, in the present instance, a roller 114 mounted upon an arm 117 secured to the outer end of a lever 118. The latter is fulcrumed to a bracket 119 secured to the lower face of the deck, and its outer end may be guided by a slotted member 120. When the lever 118 is in its raised position, arms 121 forming extensions of the arms 117 block exits 113 of the chutes, and the lever is normally maintained in its position by means of a catch 122 forming a part of a bell-crank lever and co-operating with a catch-member 122$^x$ secured to the lever 118; this bell-crank lever being pivotally secured to the under side of the field as at 123 by means of a bracket 124.

At the upper ends of the guideways 116 the field is provided with a central ridge $cx$ furnished by trap-doors 128, one for each of the chutes, and it is apparent that upon the catch 122 being released from the catch 122$^x$, and the lever 118 being permitted to fall, if the ball is within one of the chutes 104—105, this ball will move out through the proper opening 113, whereupon the lever 118 may be operated to cause the ball to be projected through the proper chute and onto the field, where it will come to lie in advance of either of figures 10 or 12 and affording that team an opportunity for "kick off" against which a goal was last scored. The raising of the lever 118 may be effected by securing to the shaft $g$ an arm 126 mounting a roller 127 which underlies the lower edge of the lever. Consequently, if this shaft is rocked in a clockwise direction, and with the lever 118 in the position shown in Figs. 4, the latter will be elevated to project a missile through one of the trap-doors 128.

If the lever 118 is swung upwardly before the missile enters one of the guideways 116, this lever is prevented from being swung to an extent at which the catches 122—122$^x$ engage by means of a finger 129 secured to a shaft 130 and arranged in the path of travel of the lever. The shaft 130 mounts curved fingers 131 extending into the chutes 116, at least one of these fingers being extended and having a spring secured thereto, which latter acts to maintain the parts normally in the position shown in Fig. 5. Thus, the lever may not be moved upwardly to any great extent if a missile is not being projected through one of the shafts, but if the missile is being raised in this manner, in passing that finger 131 which extends into its chute, it will exert a camming action against the same, resulting in a partial rotation of the shaft 130 and a movement of the finger 129 out of the path of travel of the lever 118.

In the embodiment illustrated a token- or coin-control mechanism is employed to permit an operation of the missile-delivering mechanism. It will be seen that the chute is extended to the exterior of the cabinet to provide a coin or token slot 125 therein. Disposed adjacent the chute is a switch-plate or member 133 which has its upper and lower ends 135 and 132 respectively extending into the chute. This plate is associated with a second chute member 136 pivotally mounted, as at 134, the lower end of the latter terminating in line with a lever 137 which, by means of a link 138, is connected with the second arm 139 of the bell-crank lever which provides the catch 122.

In operation it is obvious that a coin passed through the slot 125 will drop down the chute 111 and strike against the lower end of the plate 133 to shift the latter to have its upper end extend into the chute to an extent sufficient to divert a succeeding coin or token into the second chute 136. The first token or coin will, in the interim, be retained against further downward movement by striking against the inner end of one of the links 109. The second coin, however, will strike against the lever 137 and thus effect a release of the catch parts 122 and 122$^x$ so that the delivery mechanism may be operated.

The first coin will be retained until the missile passes through one of the goals, moves down one of the chutes 104—105 and strikes the plate associated therewith. This will cause a movement of the corresponding link 109 so that the first token or coin is released, for example, to be available from the exterior of the cabinet.

In order to prevent the insertion of tokens or coins through the slot 125 during the playing of the game, a rod or wire 140 has its outer end 141 entering an opening 142 in the chute 111. This rod is connected to one of the arms 31 of the shaft $q$, so that it automatically assumes an inoperative position upon the latter being moved.

Thus, in the embodiment afore described, the objects specifically aforementioned are achieved, it being understood, however, that numerous rearrangements of parts might be resorted to according to the type of game of which the invention forms a part.

I claim:

1. A device of the character described including a chute, a second chute, said first named chute receiving a plurality of tokens or coins, means for diverting, automatically, certain of the same from said first named chute into said second chute and releasing means disposed adjacent said second chute and to be actuated by coins or tokens passing into the same.

2. A device of the character described including a single chute to receive a plurality of tokens or coins, movable means associated with said chute to retain one token or coin against movement beyond a predetermined point therein, means also forming a part of said device to permit the vending of an article upon a further token or coin being passed down such chute and means operated upon the return of such article to release the retained token or coin.

3. A device of the character described including, in combination, a game, a missile impelling member and means for operating the same forming a part of said game, a coin chute or token chute, means for preventing the insertion of a token or coin thereinto and means connected with said operating means and said last named means to render the latter inoperative under certain conditions.

4. A device of the character described including, in combination, a game apparatus, a missile-delivering mechanism forming a part of the same, means for normally retaining the latter in inoperative condition, means for releasing said last named means, a chute to receive a plurality of coins or tokens and means to divert one of the tokens or coins within the same to operate said releasing means.

5. A device of the character described including a chute to receive a plurality of tokens or coins, means for retaining one of said coins within said chute, a normally locked delivery mechanism, means associated with said chute for effecting a release of said mechanism by the insertion into said chute of a second token or coin and means operating subsequently to deliver the retaining token or coin from said chute.

6. A device of the character described including a chute to receive a plurality of coins or tokens, a delivery mechanism, means connected to said mechanism to retain in a predetermined position a coin or token deposited within said chute, means operable upon the depositing of a further token or coin in said chute to permit of operation of the delivery mechanism and means operated upon an article moving towards said delivery mechanism to release the retained coin from said chute.

7. In combination a game apparatus including a missile-delivery mechanism, a single chute to receive a plurality of tokens or coins, means connected with said chute to release said delivery mechanism for operation by the depositing of one token or coin within said chute, means acting to retain another token or coin during the operation of said game and means actuated upon the successful operation of said game to return said retained token or coin.

8. In combination a game apparatus including a missile-delivery mechanism, a single chute to receive a plurality of tokens or coins, means connected with said chute to release said delivery mechanism for operation by the depositing of one token or coin within said chute, means acting to retain another token or coin during the operation of said game, means actuated upon the successful operation of said game to return said retained token or coin and means associated with said game apparatus to prevent normally the depositing of further tokens or coins within said chute during the actuation of said game apparatus.

9. In combination a game apparatus including a deck formed with an opening, a member mounted to impel a missile across the deck towards said opening, means for delivering a missile to said deck, a chute to receive a plurality of tokens or coins, means connected with said chute and operable upon the depositing of one token or coin to release said missile-delivery means and means connected with said chute and operable upon a missile passing through the deck opening to release a further token or coin deposited within said chute.

In testimony whereof, I have signed my name to this specification at 61 and 62 Chancery Lane, in the county of London, England, this 2nd day of June, 1926.

GORDON SMITH.